364-422 SR
12/12/78 XR 4,129,821

United States Patent [19]

Messner

[11] 4,129,821

[45] Dec. 12, 1978

[54] DETERMINATION OF REMANENT MAGNETIZATION OF AN EARTH FORMATION PENETRATED BY A BORE HOLE USING A MAGNETOMETER-FOLLOWED BY PROCESSING OF DATA INCLUDING MICROPULSATION DATA

[75] Inventor: Harold D. Messner, Vallejo, Calif.

[73] Assignee: Chevron Research Company, San Francisco, Calif.

[21] Appl. No.: 498,359

[22] Filed: Sep. 5, 1974

[51] Int. Cl.[2] .......... G01V 3/00; G01V 3/18

[52] U.S. Cl. .......... 324/8; 364/422

[58] Field of Search .......... 324/6, 8, 1; 235/151.3, 235/151.35; 364/422

[56] References Cited

U.S. PATENT DOCUMENTS

| | | | |
|---|---|---|---|
| 3,014,177 | 12/1961 | Hungerford et al. | 324/8 |
| 3,187,252 | 6/1965 | Hungerford | 324/6 |
| 3,317,821 | 5/1967 | Patton et al. | 324/8 |
| 3,369,174 | 2/1968 | Groenendyke et al. | 324/8 |
| 3,391,335 | 7/1968 | Patton et al. | 324/8 |
| 3,402,348 | 9/1968 | Hoehn et al. | 324/8 |

*Primary Examiner*—Gerard R. Strecker
*Attorney, Agent, or Firm*—R. L. Freeland, Jr.; Harold D. Messner

[57] ABSTRACT

In accordance with the present invention, the remanent magnetization of an earth formation penetrated by a bore hole is accurately indicated even in the presence of high solar and atmospheric disturbance affecting the earth's normal field. A highly sensitive magnetometer is positioned within the bore hole in a direction S at a plurality of logging stations within the bore hole. Although at each station the response measured includes contributions other than that associated with the remanent magnetization of the formation, such other components can be easily isolated and removed from the measured response of each logging station, such removal processes including accounting for changes in the earth's normal field waveform (micropulsation effects) using waveform migration techniques as provided by a properly programmed digital computer.

5 Claims, 11 Drawing Figures

DIGITAL RECORDER 21
5
25
SYSTEM CONTROLLER PROCESSOR
MAGNETIZATION PROCESSOR CIRCUIT
24
11
26
20
ASSOCIATED SYSTEM DATA
10
19
18
10C
17
10b
15
12
10a
14
13
16

219
207
220
222
223
224
225
BINARY-TO -LOG CONVERTER
MULTIPLEX ADDER
MULTIPLEX LOG-TO-BINARY CONVERTER
MULTIPLEX ADD-ACCUMULATE
MAGNITUDE GENERATOR
OR GATES
218
214
DECODING AND CONTROL
COEFFICIENT TABLE MEMORY GATE
221
208
MEMORY
GATE
210
RECORDER
BUFFER
209

DETERMINATION OF REMANENT MAGNETIZATION OF AN EARTH FORMATION PENETRATED BY A BORE HOLE USING A MAGNETOMETER-FOLLOWED BY PROCESSING OF DATA INCLUDING MICROPULSATION DATA

RELATED APPLICATIONS INCORPORATED HEREIN BY REFERENCE

S. H. Yungul, Ser. No. 492,639, now U.S. Pat. No. 3,965,412 for "DETERMINATION OF REMANENT MAGNETIZATION OF AN EARTH FORMATION PENETRATED BY A BORE HOLE USING AN ACCURATE MAGNETOMETER," filed July 29, 1974, and Ser. No. 492,638, now U.S. Pat. No. 3,965,413 for "DETERMINATION OF THE POLARITY OF REMANENT MAGNETIZATION OF AN EARTH FORMATION PENETRATED BY A BORE HOLE USING A HIGHLY ACCURATE MAGNETOMETER FOLLOWED BY PROCESSING OF RESULTING AS WELL AS ASSOCIATED DATA," filed July 29, 1974.

BACKGROUND OF THE INVENTION

Field of the Invention

The present invention relates to a method for indicating the remanent magnetization of an earth formation penetrated by a bore hole, even in the presence of high solar and atmospheric disturbance, so as to indicate the geologic age of a segment of the formation and to document stratigraphic boundaries occurring, say, during generation and migration of petroleum over a given span of geologic time, such as when accumulative traps were generated.

In the 1940's geologists and geochemists were attracted to a new hypothesis of petroleum origin and accumulation: early accumulation of hydrocarbons was thought to occur primarily from living organisms present in small amounts in most marine segments at the time of deposition. In the 1960's, geochemical evidence mounted that refuted the early-accumulation hypothesis as the principal mechanism fofr petroleum generation and accumulation. Such evidence included the fact that hydrocarbon molecules from 2 to 13 carbon atoms, i.e., $C_2$–$C_{13}$, have been shown to be virtually absent in modern sediments. As such hydrocarbons comprise up to 25 percent of an average petroleum accumulation, the former must be formed by progressive alteration of immobile hydrocarbon precursors.

In analyzing an earth formation penetrated by a well bore regarding hydrocarbon potential via progressive alteration, not only should indicies of, say, geothermal gradients, migration quantity and direction be generated, but also the age of the strata of interest must be accurately determined.

However, geologic age-dating of the adjacent strata by conventional in-hole dating equipment not only is time-consuming and costly but also produces inaccurate results.

It is well known in carrying out geologic dating that the magnetization of a section of earth formation is associated with magnetic fields that are intrinsic to that body and act at a distance from it. Since the direction and strength of the fields can be identified, there can be gained an indication of both origin of the body and, hence its geologic age, assuming the field of interest can be accurately determined.

The following equation relating the magnetization of a given sample volume of an earth formation as a source of potential magnetic field is well known:

$$M = \vec{M}_R + K\vec{H}_o$$

where M equals the magnetization or magnetic dipole moment per unit volume of a sample;

$\vec{M}_R$ equals the natural remanent magnetization of the sample; and $K\vec{H}_o$ equals the induced magnetization of the sample.

In contrast with the above known functional relationship, and as discussed in the above-cited applications assigned to the same assignee as in the present application, the measurement of the intensity associated with the contribution of the natural remanent magnetization can be difficult to obtain, since measurements are carried out in the presence of the earth's field. Not only is the intensity of the anoamaly due to the remanent magnetization small in comparison with the induced magnetization, and its direction dependent upon the paleomagnetic origin of the sample as well as subsequent movement of the sample remote from the origin as a function of geologic time ("continental drift"), but also the earth's normal field can undergo rapid variations due to incidence of electromagnetic waves of solar and atmospheric origins.

SUMMARY OF THE INVENTION

In accordance with the present invention, the remanent magnetization of an earth formation penetrated by a bore hole is accurately indicated even in the presence of high solar and atomospheric disturbance. A high-sensitivity, directional magnetometer is positioned within the bore hole substantially in a direction S of maximum natural remanent magnetization response of the formation. The magnetometer's axis of response should be substantially parallel to the direction S of maximum response. In this application, the term "S direction" refers to that direction relative to magnetic north and the bore hole axis associated with maximum response of the remanent magnetization associated with rock sources adjacent the bore hole. It is determined from studies and investigation of the nature of such rock sources including, inter alia (i) the geologic age of such sources (ii) paleolatitudes of (i), above, at formation, and (iii) the average inclination and declination of the remanent magnetization of the rock sources of interest.

After the earth field in the S direction has been measured, conventional magnetic susceptibility measurements at each logging station are carried out. Such measurements can be obtained using either AC measurement techniques such as shown in U.S. Pat. No. 3,555,409 for "Magnetic Susceptibility Logging System", G. R. Atwood et al or DC measuring techniques such as shown in U.S. Pat. No. 3,665,296 for "Susceptibility Meter for Field Use for Determining Susceptibility of a Rock Outcrop", H. Gross et al.

Next, while the magnetometer remains reposed to detect flux in the S direction with maximum efficiency, the sonde is lowered, in sequence, to each logging station, and magnetic anomalies in the S direction determined. At the earth's surface, processing circuits perform mathematical operations which determine the magnitude of the magnetic anomaly due to remanent magnetization contribution, which includes mathematical operations for (i) determining the induced magnetization contribution associated with the S direction at each logging station and then (ii) subtracting that value from the total magnetization contribution at the depth of interest. Accuracy of steps (i) and (ii), above, of course, requires that time variations (micropulsations) of the earth's field waveform over the measuring cycle be taken into account.

For this purpose and in accordance with the present invention, an apparatus for migrating such time variations to become correctly associated with the aforementioned logging stations is provided, such apparatus utilizing (a) memory means for storing the magnetic field waveform as binary data;

(b) means for digital filtering such binary data according to their frequency characteristics, such filtering means including associated circuitry for migrating the filtered data to a series of depth locations as a function of conductivity of the intervening formational strata, and (c) means for storing the resulting data as a function of depth.

In that way, as the aforementioned mathematical procsssing operations occur, accuracy of data relative to the earth's field at each of the logging stations of interest is assured.

OBJECT OF THE PRESENT INVENTION

The object of the present invention is the provision of a novel method for accurately indicating the remanent magnetization of an earth formation penetrated by a well bore, wherein the effects due to time variation (micropulsation) of the earth's normal field waveform over the measuring cycle is taken into account.

FURTHER OBJECTS OF THE INVENTION

Further objects and features of the invention become readily apparent to those skilled in the art from this specification and appended drawings illustrating preferred embodiments.

RELEVANT DEFINITIONS

"Average deviation" and "Inclination" are defined as the average angle of repose between the bore hole axis and true vertical;

"Azimuth" is an angle reckoned clockwise from magnetic north and a vertical plane through the bore hole;

"Bearing" relates to the aximuthal direction in which the bore hole is tilting;

"Drift" is the attitude of a bore hole;

"Drift angle" is the same as "deviation";

"Drift azimuth" is the same as "azimuth".

DETAILED DESCRIPTION OF SPECIFIC EMBODIMENTS

Figure 1:
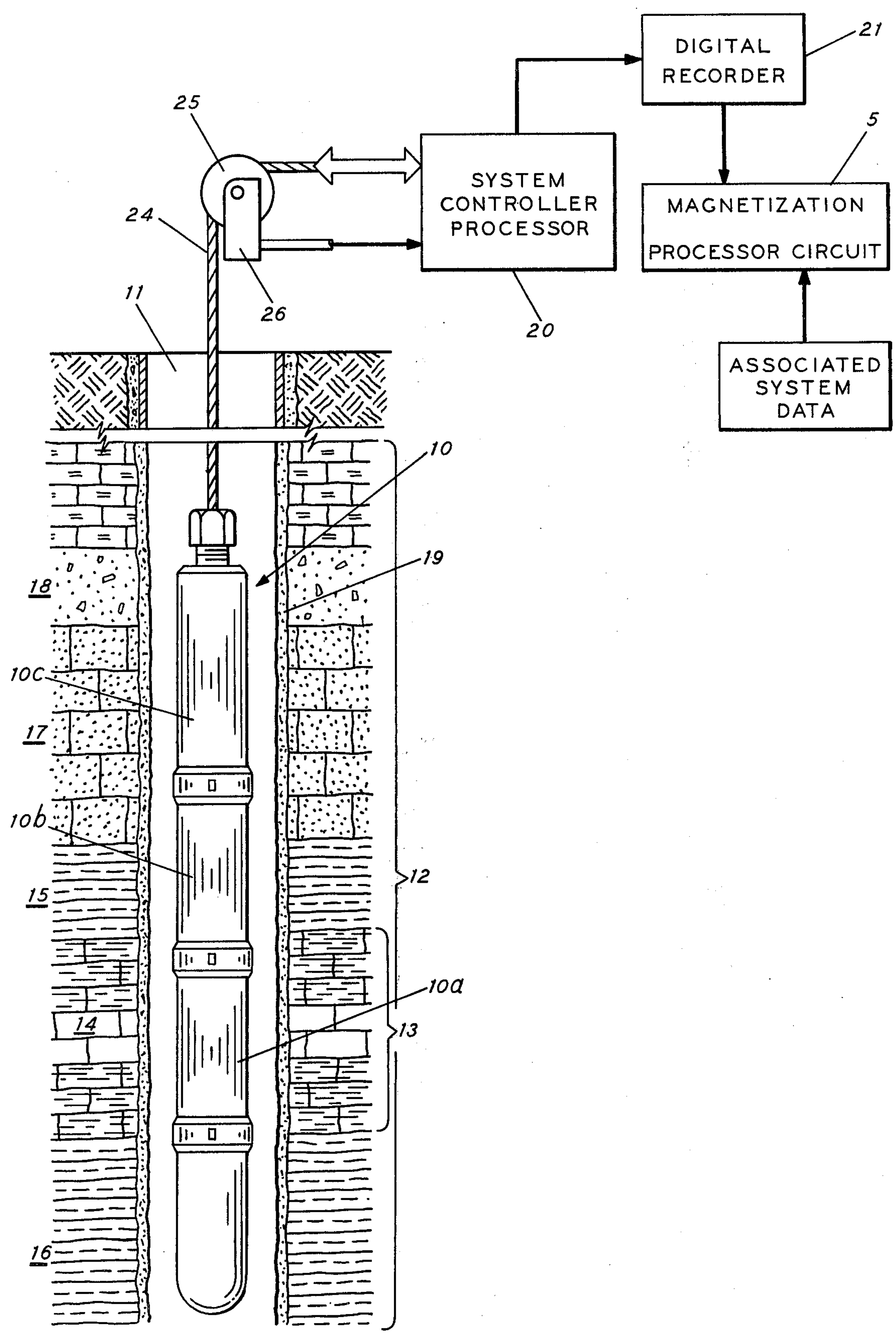
FIG. 1 is a sectional view of a bore hole penetrating an earth formation, illustrating the position of a logging sonde incorporating a highly sensitive magnetometer useful in identifying the remanent magnetization characteristics of the adjacent formation.

References should now be had to the Figures, and in particular to FIG. 1. In FIG. 1, a logging sonde 10 is seen to be located at a selected logging depth within bore hole 11 adjacent to earth formation 12. The sonde 10 is provided with a series of axial abutting sections: a highly sensitive magnetometer section 10*a* is seen to attach below circuitry control and energization sections 10*b* and 10*c*. The purpose of the magnetometer section 10*a:* to provide means for measuring the total magnetization contribution of earth formation 12 as explained in detail below.

Note that although extending parallel to the side wall of well bore 12, the oil reservoir 13 is horizontally separated into two horizontal segments, both of which reside within sedimentary bed 14. Bed 14 is also seen in FIG. 1 to lie between two more impermeable beds 15 and 16 and can be composed of a pervious oil-bearing sandstone. Additional strata such as sedimentary beds 17 and 18, identical to bed 14 except they are not oil-bearing, are located above the beds 15 and 16, respectively. During drilling of the well bore 11, drilling fluids control the hydrostatic fluids contained within the earth's formation 12 forming a filter cake 19 throughout the vertical extent of the well bore 11. It is imperative that the response of the magnetometer (not shown) within the magnetometer section 10*a* penetrate the formation 14 at least behind the invaded zone with adequate resolution to ultimately indicate the direction of the remanent magnetization of that formation.

In accordance with the present invention, the magnitude of the anomaly due to the total magnetization contribution of the earth formation penetrated by the well bore 11 is measured in a predetermined direction S utilizing a directional magnetometer (not shown) carefully positioned within the magnetometer section 10*a* of the logging sonde 10. From these data, the remanent magnetization contribution can be determined utilizing mathematical operators within magnetization digital processor circuit 5 of FIG. 1, as explained below, whose operations are improved by accounting for time variations in the earth's normal field waveform over the measuring cycle. In that way, the resulting remanent data are accurate enough to actually aid (i) in providing geologic age-dating of formation 12, and (ii) in providing correlation information related to sedimentary basins; i.e., correlation of bedding from well to well indicating boundaries of such sedimentary basins.

Controller-processor 20 at the earth's surface is in operational contact with downhole control circuitry (not shown) housed in circuitry sections **10*b* and 10*c* for control of, inter alia, the magnetometer within magnetometer section 10*a***. Temperature is also noteworthy in bringing about desired magnetometer operations. A low-temperature environment is probably best, at least compatible with magnetic characteristics of the magnetometer.

In order to provide support of the logging sonde 10 within the well bore, a cable 24 is seen to be attached to uppermost section **10*c* of the logging sonde 10. Cable 24 also includes a series of conductors. These conductors interconnect sections 10*a*, 10*b* and 10*c* with controller-processor 20 at the earth's surface as explained below. Suffice it to say that in operation, energization signals are passed from the controller-processor 20 through slip-bearing assembly 25 and thence through the conductors to circuitry within sections 10*b* and 10*c* of sonde 10 for controlling the magnetometer within section 10*a* of the sonde 10. During detection of the magnetic field intensity of the earth formation 12, signal transmission is reversed: signals pass from the magnetometer section 10*a* upward through sections 10*b* and 10*c*, cable 24 and thence through slip-ring assembly 25 to the controller-processor 20 and then in proper sequence to digital recorder 21, where the information is encoded on magnetic tape. Within the controller 20, circuits are provided for providing associated information such as depth of the magnetometer, and the intensity of the received field in a format compatible with later processing, say, in a binary format for processing by a digital computer. The mapping depth data are provided through a binary encoder 26 connected to the controller-processor 20; the intensity of the magnetic field as is also indicated and recorded in digital format through a cooperative functioning of the controller-processor 20 in conjunction wth recorder 21, as explained below. Thereafter, further processing of the data, say within processor circuit 5** at the earth's surface, provides a determination of mathematically related data, including micropulsations associated with the earth's field whereby the remanent magnetization of the formations can be easily and accurately determined. By associating depth, azimuth and magnetization indications as explained below, information can be assimilated to indicate the geologic age of the formation being mapped.

Operational aspects of the present invention are provided by (i) field synchronization via proper functioning of the processor-controller 20 (FIG. 1) and (ii) process synchronization by magnetization process circuit 5 of FIG. 1. Signals can be applied through associated circuits, as explained below, to provide needed control within process circuit 5. Since control functions are divided into cycles of operations related to the field operations of digitization and recording of magnetic signals, and digitization and recording of azimuthal and depth data, as well as the processing of the resulting magnetic data including compensating for variations of the earth's magnetic waveform, the system of the present invention will now be discussed in relation to these functions.

Figure 2:
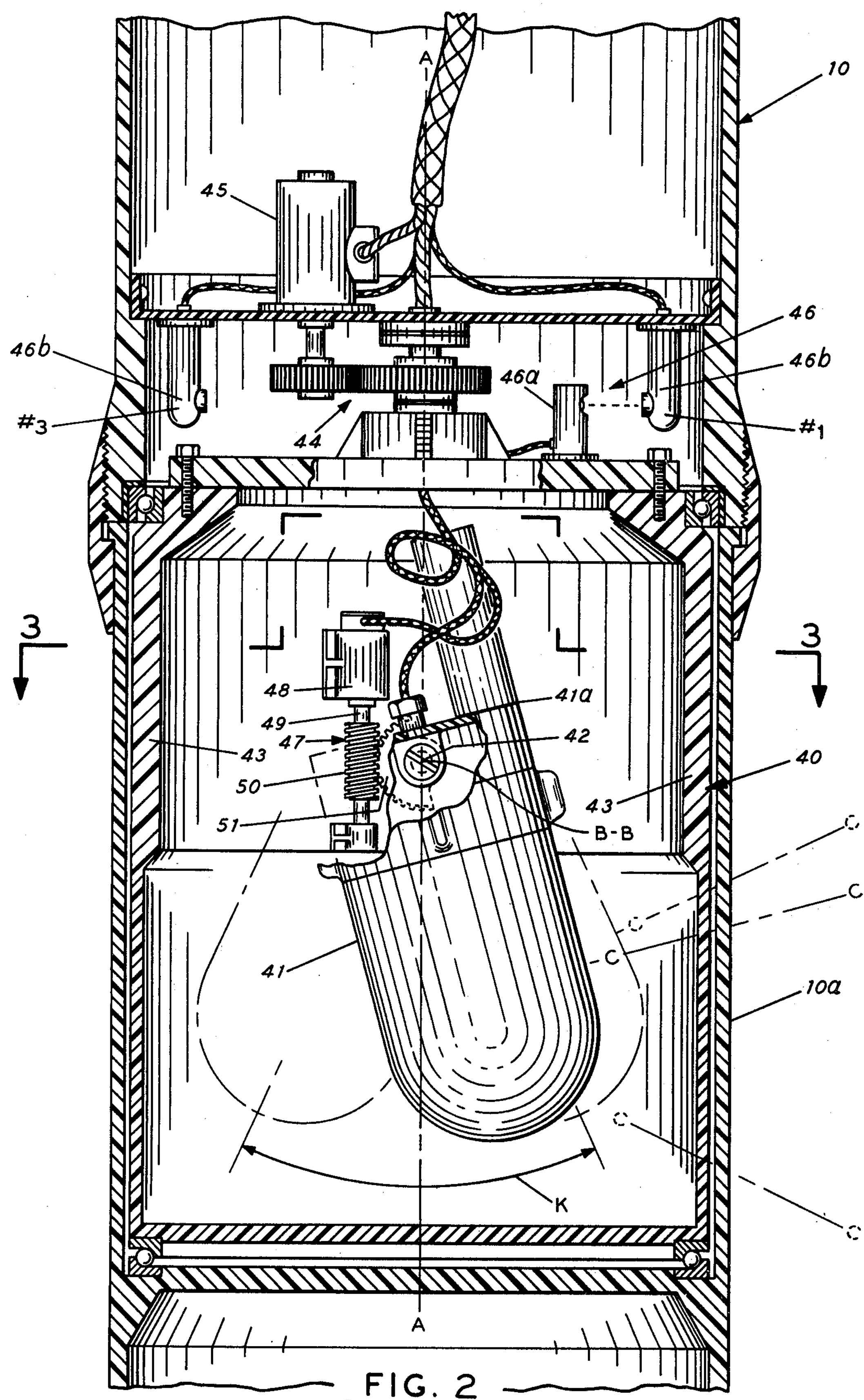
FIG. 2 is a partial sectional view of the logging sonde of FIG. 1 in which both a magnetometer support capsule, as well as driving equipment for reorienting the magnetometer capsule in azimuth, are shown in detail.
Figure 3:
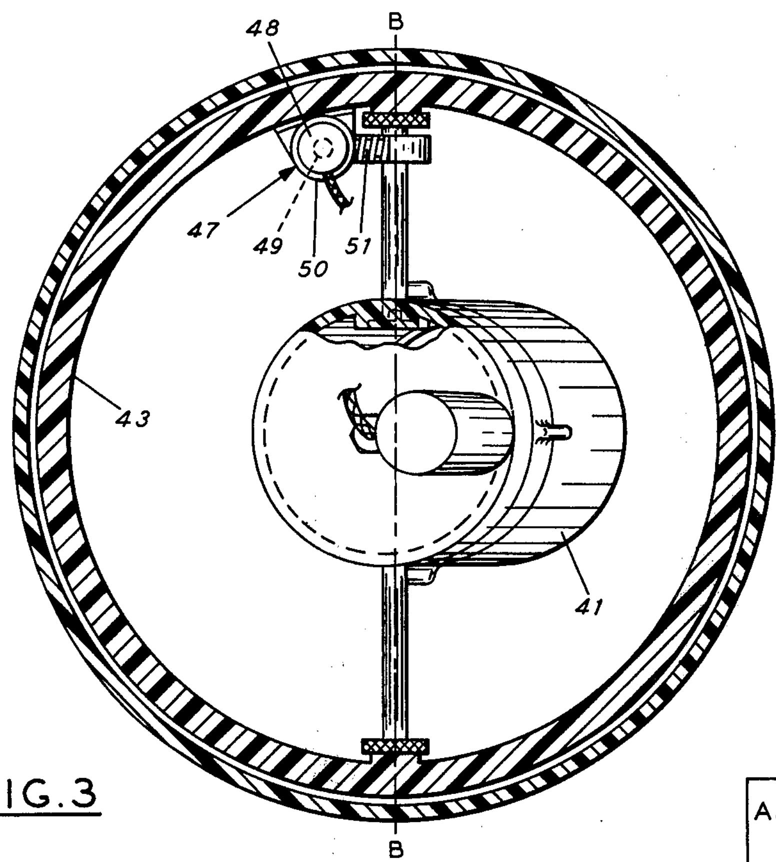
FIG. 3 is a plan view of the magnetometer capsule of FIG. 2.
Figure 4:
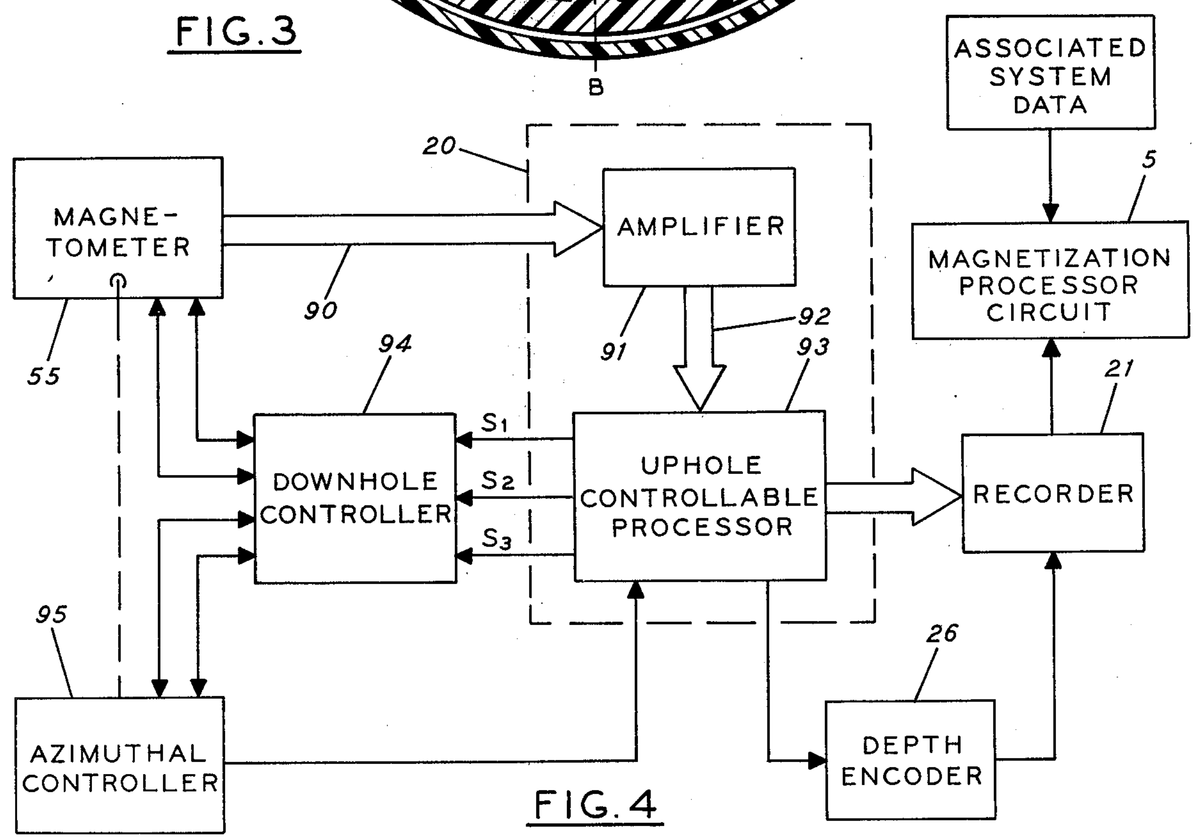
FIG. 4 illustrates, in functional block form, the remanent magnetic logging system, including the magnetometer of FIGS. 2 and 3, for carrying out the method of the present invention.
Figure 5:
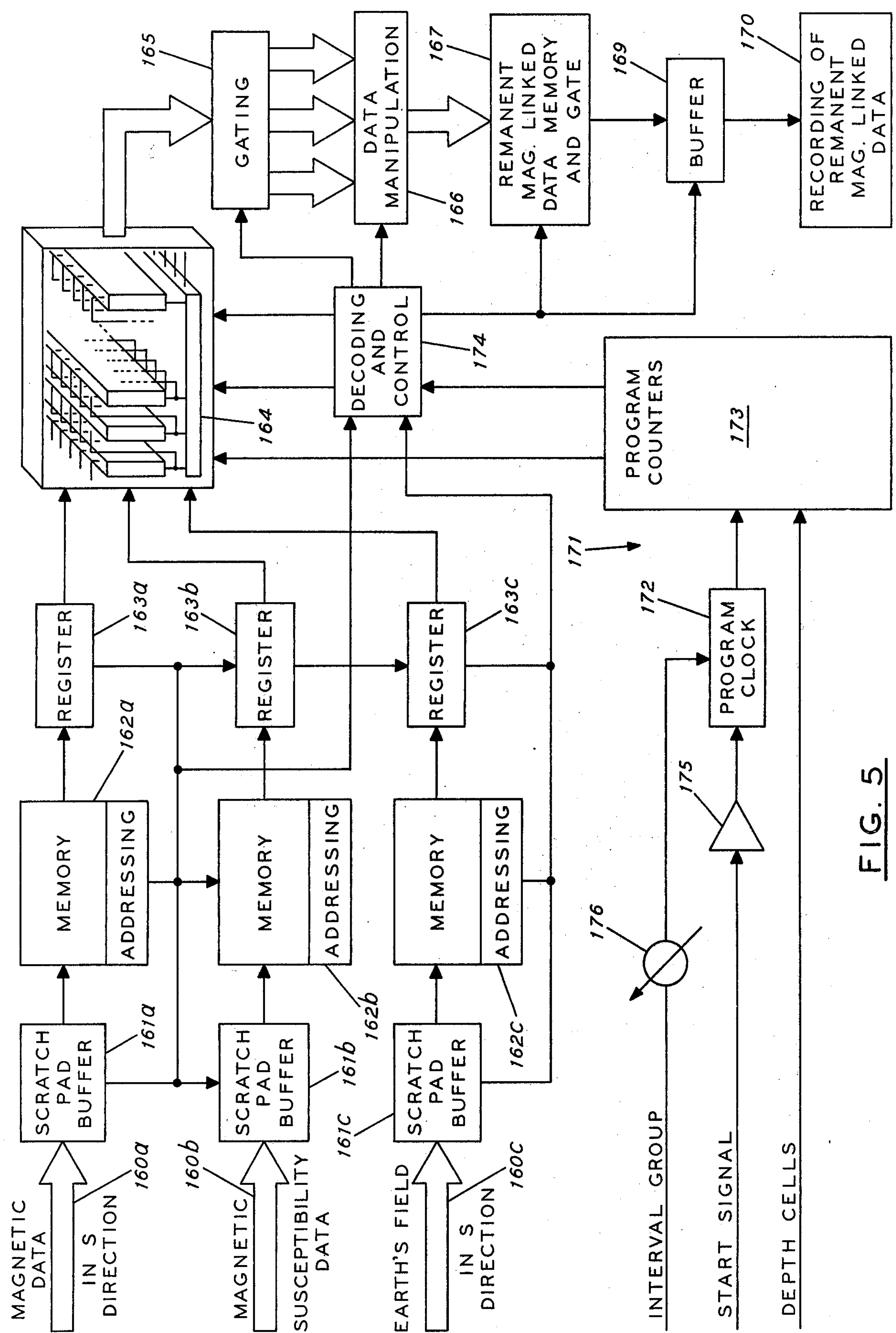
FIGS. 5 and 6 are block diagrams of magnetization processor illustrated in FIG. 1.
Figure 6:
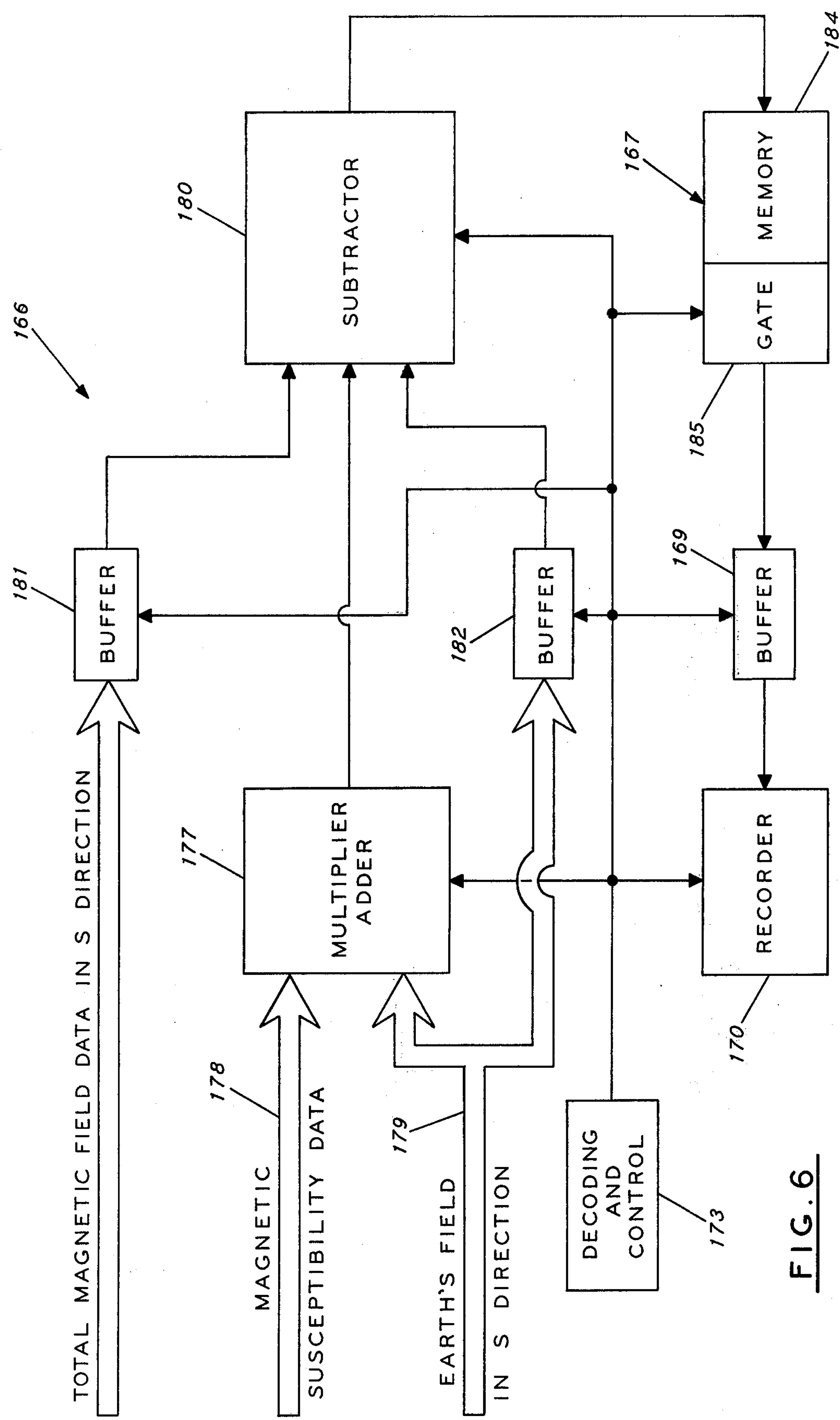
Figure 7:
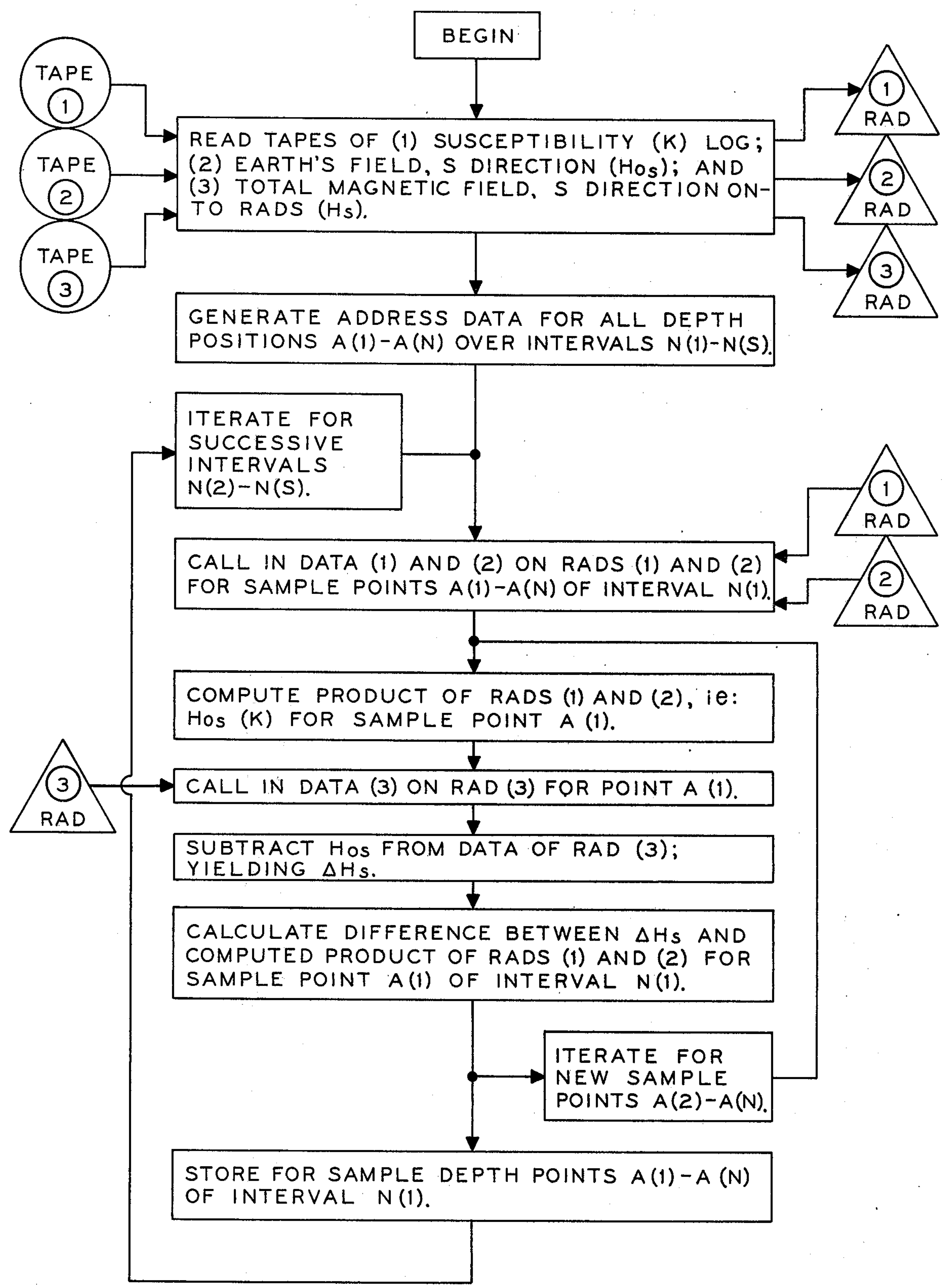
FIG. 7 is a flow chart of a general-purpose computer program for performing the determination of the remanent magnetization intensity in accordance with one aspect of the method of the present invention.
Figure 8:
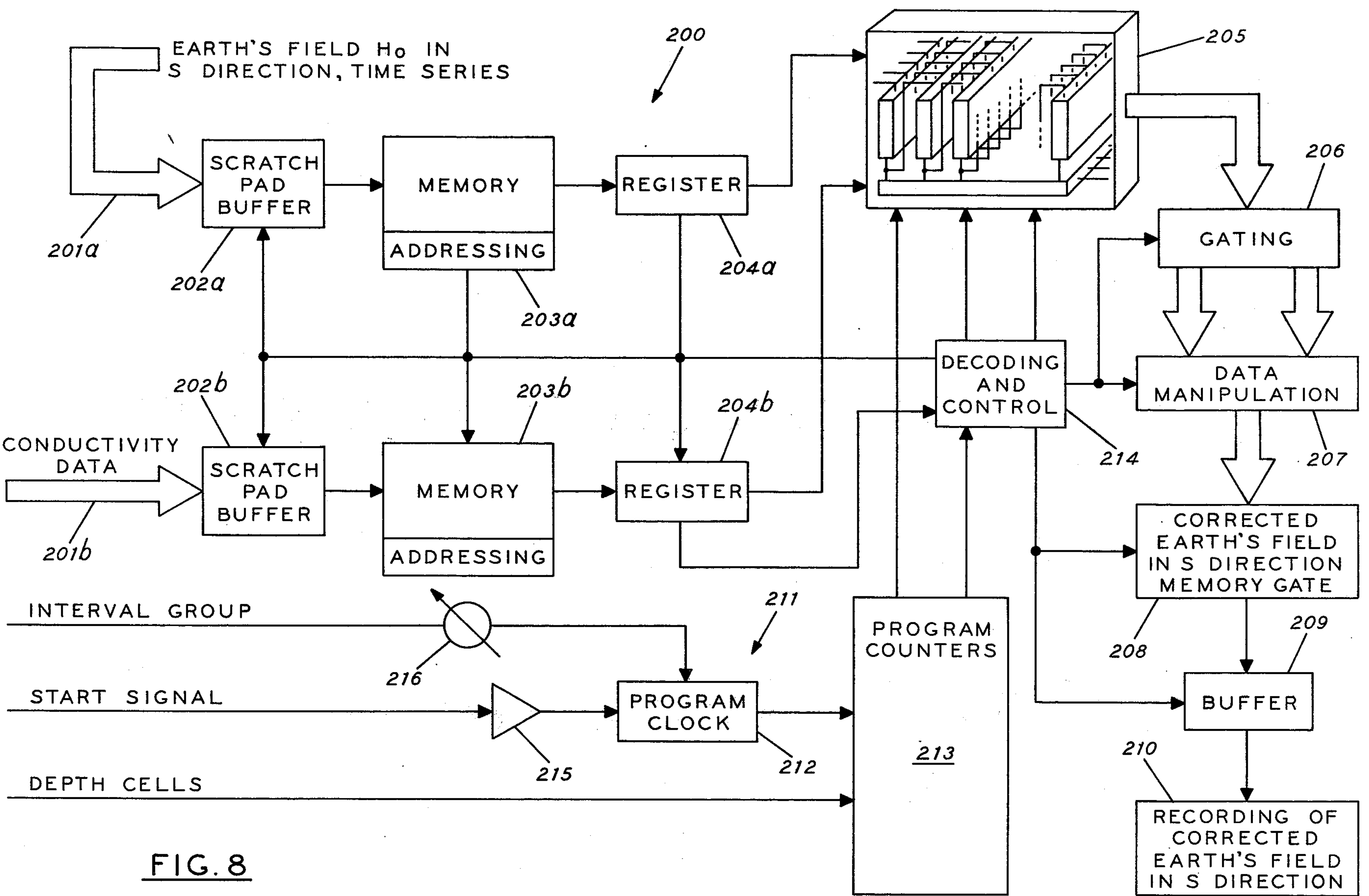
FIGS. 8 and 9 illustrate a micropulsation compensating circuit for use in determining data related to the true earth's magnetic field even in the presence of time variation of the earth's field waveform, such data being useful within a digital magnetization processor of FIG. 1.
Figure 9:
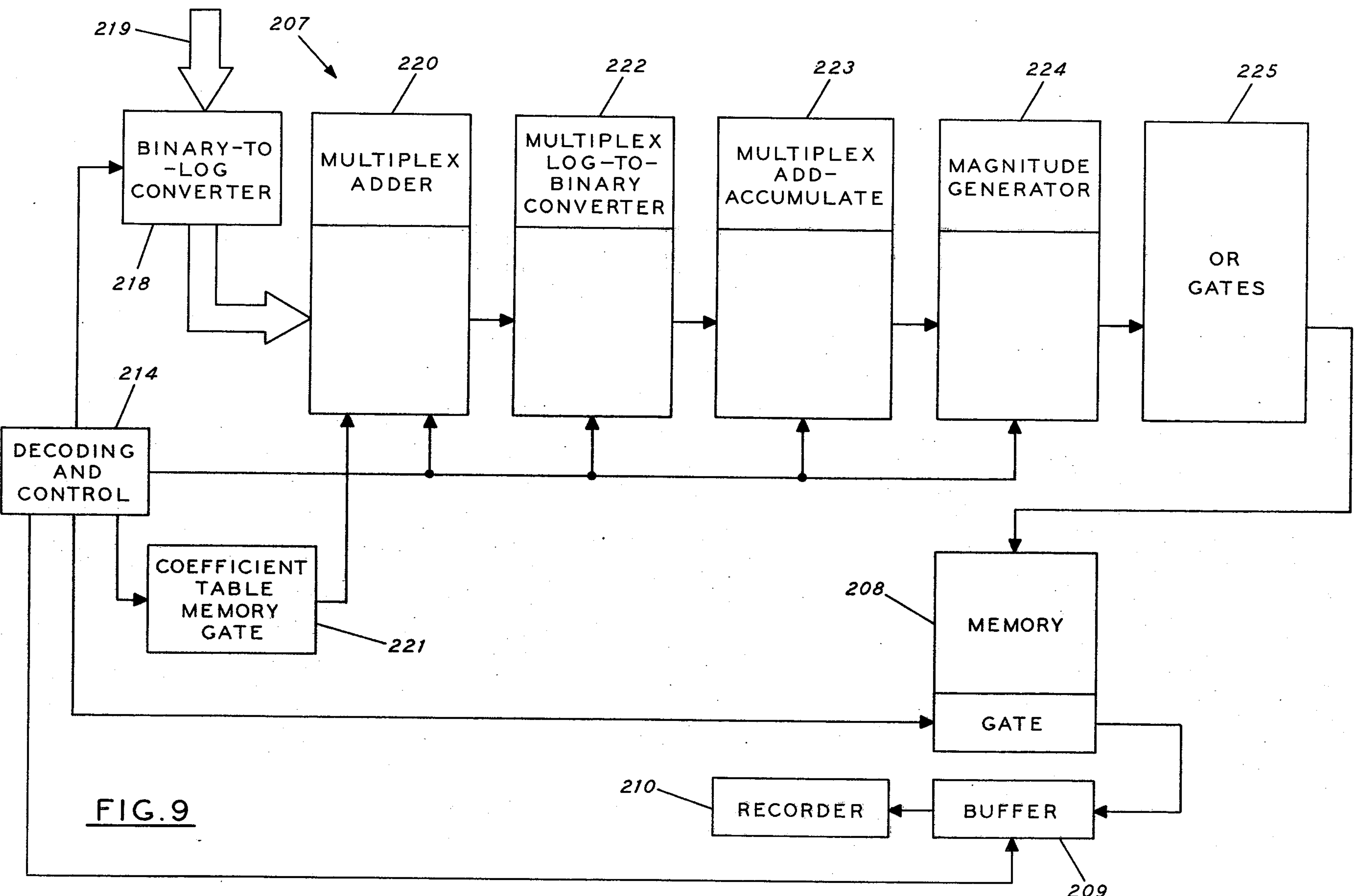

Furthermore, in the description which follows, it should be apparent that there is no need for a detailed description of: (i) magnetometer section **10*a* containing a magnetometer (FIGS. 2, 3 and 4) or (ii) in-house processing of magnetic field data to provide an indication of the remanent magnetization not compensated for micropulsations (FIGS. 5, 6 and 7). Reason: the description as to items (i) and (ii) above has been set forth in detail in the following applications incorporated herein by reference: S. H. Yungul, Ser. Nos. 492,638 and 492,639, op. cit. However, in order that accurate induced magnetization results be provided by processor circuit 5 of FIG. 1, there is a need to compensate for variations — with time — of the earth's normal field waveform over the measuring cycle. For this purpose, a micropulsation compensating circuit is provided, as shown in FIGS. 8 and 9, within the processor circuit 5. However, before describing that circuit of FIGS. 8 and 9** in detail, a brief description of the nature of the problem of micropulsations may be of interest, particularly as it relates to the accurate determination of the induced magnetization contributions of rock sources positioned adjacent to a bore hole.

Micropulsations are the rapid fluctuations of the earth's magnetic field due to electromagnetic waves of solar and atmospheric origins. Normally, the amplitude of the vertical component in these micropulsations in less than about 0.1 of the total horizontal component, unless the subsurface contains abrupt lateral conductivity discontinuities (e.g., piecemeal salt domes). Likewise, normally the amplitude of the total horizontal component is between about 0.01 and 0.001 gamma (one gamma $= 10^{-5}$ oersted) for frequencies higher than about 0.1 Hz. For lower frequencies the amplitude increases as the frequency decreases, to about 0.01 gamma for 0.1 Hz and 1 gamma for 0.001 Hz. The above-recited values are statistical averages for normal conditions and mid-latitudes, and may vary by an order of magnitude, depending on time, latitude, and geologic condition.

A prior art method of removing the micropulsation contribution so as to aid in providing an accurate induced magnetization contribution was by filtering. However, since the filter design depends on (1) logging speed, (2) layer thicknesses, (3) the amplitude spectrum of the micropulsations at the surface, (4) depth of measurement, and (5) the conductivity structure of the subsurface, the procedure has been found to be difficult to implement under field conditions.

Another prior art method relates to a processing technique in which the induced operator contribution is produced by "stacking" methods. Of course, superposition is one of the oldest and surest ways of cancelling magnetic field time variations, provided the logging speed of the sonde (as the bore hole data is being measured) is high enough; however, where station-to-station discontinuous logging is required, the micropulsations associated with the earth's field must be compensated for if the resultant induced magnetization contribution is to be accurately determined. For this purpose, compensation circuit 200 of FIGS. 8 and 9 is provided.

In brief, circuit 200 provides for Fourier transformation of the micropulsation waveform followed by convolving the resulting signal spectrum with a weighting function based on the conductivity data of the earth formation under investigation. After re-transformation, there is generated a corrected series of values for the earth's field intensity in the S direction at the depths of interest.

Now, in more detail, reference is made to FIG. 8 illustrating the operation of compensating circuit 200. It is assumed that the micropulsation data [HOS(t)] operated on by circuit 200 has been obtained in a digital format suitable for inputting to a digital computer, and edited such that there is time coincidence between the resulting waveform and measuring cycle of the logging sonde. Also, it is assumed that the conductivity data of the formation, i.e., inverse resistivity, have been obtained in digital formal in advance, say by using conventional induction logging techniques in which the earth formation is energized by a known induction field and the E.M.F. developed across the formation is measured. (In such techniques, an AC flow of current through a "transmitter" coil can be used to generate the induction field by introducing eddy currents into the formation, which, in turn, set up a secondary magnetic field and induce an E.M.F. in a "receiver" coil. If the energizing current is constant in amplitude and frequency, the E.M.F. is proportional to the total mutual inductance of the circuit: (i) to the spacing between the two coils, and (ii) to the conductivity of the earth formation. In this regard, see "Exploration Geophysics", J. S. Jakosky, Trija, 1950, at pages 1057 et seq.). Still further, it should be apparent that the earth's magnetic field in the S direction has likewise been measured along with its micropulsation waveform and recorded at recorder 21 under control of controller-processor 20, such micropulsation waveform data—HOS(t)—being inputted to the circuit 200 of FIG. 8 via source line 201*a*. From the source line 201*a*, the data then flow through buffer 202*a*, memory/addressor 203*a*, register 204*a*, to memory 205.

Paralleling the inputting of the micropulsation waveform are data associated with the conductivity of the earth formation as a function of depth along the bore hole. It is seen in FIG. 8 that it is applied via source line 201*b* and passes through buffer 202*b*, memory/addressor 203*b* and register 204*b* to the same memory 205.

Memory/addressors 203*a/b* pack several digital words into one memory word, as well as reduce data flow rates into the memory 205. Since it is recognized that the instantaneous flow rate into memory/addressors 203*a/b* may be significantly higher than the average flow rate, the memory 205 can thus operate at a much slower and constant flow rate.

Registers 204*a/b* receive the data from the memory-/addressors 203*a/b* and pass same to the memory 205 in word serial form.

After the data have been sorted into proper depth and interval groups, the data are next extracted from the memory 205 and passed through gate 206 to data processing circuit 207 where data streams are organized as Fourier transforms, convolved and then retransformed as explained below ["migrated"]. From the processing circuit 207, the "migrated" data are subsequently grated through memory gate network 208, buffer 209, to digital recorder 210, where recording occurs.

Control of operations is conventional: a timing and logic circuitry 211, which includes a program clock 212 and programming timing counter 213, as well as decoding control circuit 214, synchronizes operation; a start signal is first passed through buffer amplifier 215 to the programming clock 212. Parallel to the start signal circuit is adjustment circuit 216, which can change operations, as required. For example, the rate at which the system recycles, i.e., iterates, can be changed by the operator by resetting adjustment circuit 216 to new values. As the program clock 212 is activated by the start signal, program counter 212 in turn becomes operative and produces a series of signals which control decoding and control unit 214 in operative and produces a series of signals entering and leaving memory 205, as well as controlling mathematical enhancement of the data as described below. In this regard, note that the control unit 14 (i) extracts the data streams from memory 205; (i) controllably gates them through gates 206 and 208; (iii) mathematically operates upon them at processing circuit 207 and (iv) records the results at recorder 210 through action of buffer memory 209.

FIG. 9 illustrates data processing circuit 207 in more detail. In FIG. 9, note that the data stream is limited to the earth's field waveform in the time domain which passes first into a binary convertor 218, say through source line 219, where Fourier transform generation begins. It is assumed for descriptive purposes that the conductivity data have already been processed in conjunction with discrete amplitude and signal spectra relationships, using known mathematical and geometrical associations to provide a series weighting coefficients associated with given depths within the earth formation under study, such coefficients being stored in memory gate 221.

In order to understand the purpose of such weighting coefficients, a brief discussion of Fourier transforms in general, and modified discrete Fourier transforms generation in particular, appears in order.

In general, when a time signal is sampled at a rate $f_s$, the signal spectrum is shifted around multiples of $f_s$. If the signal is such that it will occur within a known band having a highest frequency F which is less than $f_s/2$, no aliasing errors occur, and if the sampled signal is held at its sampled value for a portion of time, $\Delta t$, of the sampling interval, the sampled spectrum is multiplied by a (sin x)/x type function.

The Fourier transform of a sampled and held signal, found by the method of successive differentiation, is $$X_s(\omega) = \Delta t e^{\frac{-j\omega\Delta t}{2}} \left[ \frac{\sin \frac{\omega\Delta t}{2}}{\frac{\omega\Delta t}{2}} \right] \sum_{k=0,\ \text{etc.}}^{N-1} x_k e^{-j\omega k\Delta t} \quad (1)$$

where N is the number of samples and $x_k$ are the samples' signal values. $X_s(\omega)$ may be thought of as the product of a modulating signal, $$F(\omega\Delta t) = e^{\frac{-j\omega\Delta t}{2}} \left[ \frac{\sin \frac{\omega\Delta t}{2}}{\frac{\omega\Delta t}{2}} \right] \quad (2)$$

and a modulated signal, $$G(\omega,t) = \Delta t \sum_{k=0,\ \text{etc.}}^{N-1} x_k e^{-j\omega\Delta tk} \quad (3)$$

The modulating signal is independent of the sampled signal and is merely a by-product of the sample and hold process. The modulated signal is the discrete Fourier transform (DFT) of x(t), the time signal. For a sinusoidal input, i.e., $$x_k = e^{-j(\omega_s t_k + \phi)} \quad (4)$$

where $t_k = f_s$, the magnitude of the DFT is given by Equation (5):

$$|S(\omega)|^2 = \left[ \frac{\sin \frac{\omega \Delta t}{2}}{\frac{\omega \Delta t}{2}} \right] \left[ \frac{\sin(\omega + \omega_s)(N-1)\Delta t/2}{\sin(\omega + \omega_s)\Delta t/2} \right]^2 \quad (5)$$

The DFT may be thought of as a bank of elemental band-pass filters. The Fourier transform of an infinite duration sinusoid may be thought of as a band-pass filter which passes a single frequency. Similarly, the DFT may be thought of as a band-pass filter which only passes signals near its center frequency. Note that both give a frequency function output.

An alternate method of medium complexity and time delay consists of adding a time weighting function to a DFT computation. This method is called modified discrete Fourier transform processing (MDFTP).

The MDFTP technique consists of multiplying the sampled signal by a weighting function. Since time domain multiplication corresponds to frequency domain convolution, the convolution of the signal spectrum with the proper weighting function not only provides correct filtering operations but also effectuates the complex relationship existing between the earth's field data at the earth's surface and these same data migrated to the depths of the interval interior of the earth formation under investigation. The MDFTP filter design consists of selecting the proper weighting coefficients.

Several logarithms may be used in implementing the filter equation. Each filter computes $$Y(r) = \sum_{i=0}^{N-1} x_i C_{ir} \quad (6)$$

where $$C_{ir} = \omega_{ir} e^{\frac{-j2\pi ir}{N}} \quad (7)$$

is a complex coefficient; r is the normalized frequency; N is the number of samples; and $\omega_{ir}$ is a weighting coefficient. Since $$X_i C_{ir} = 2^{(\log_2 x_i + \log C_{ir})} \text{ for } X_i \neq 0 \text{ and } C_{ir} \neq 0 \quad (8)$$

multiplication can be reduced to an addition of the logarithms of $X_i$ and the coefficients. Also, since $\log_2 x_i$ is used by each filter, a single binary-to-binary logarithm converter is sufficient.

For a more complete understanding of binary logarithm conversion, reference is made to the following publications: J. N. Mitchell, Jr., "Computer Multiplication and Division Using Binary Logarithms," IEEE Transactions on Electronic Computers, Vol. EC-11, pp. 512–517, Aug. 1962; M. Combet, H. Van Zonneveld, and L. Verbeek, "Computation of the Base Two Logarithm of Binary Numbers," IEEE Transactions on Electronic Computers, Vol. EC-14, No. 6, pp. 863–867, Dec. 1965.

A discussion of the discrete Fourier transform and techniques for its use can be found in G. D. Bergland, "A Guided Tour of the Past Fourier Transform," IEEE Spectrum, July 1969, pp. 51–52, with an extensive bibliography.

Returning to the binary log converter 218 of FIG. 9, the binary data are there converted to logarithmic form, i.e., to the base 2. Each input after conversion to a multibit binary logarithm is presented to multiplex adder 220, say to an adder of a series of parallel filters. Also entering multiplex adder 220 is a series of weighting coefficients from memory gate 221 under control of decoding and control circuit 214. The coefficients add to the logarithmetic signal to accomplish the needed operator function within the adder 220. The result is a complex number. At log-to-binary convertor 222, the multiplexed signals are reconverted to a binary format. Thereafter they then divide into real and imaginary parts prior to entry into accumulator 223. At the accumulator 223, the real and imaginary parts are converted from parallel to serial flow and then pass to magnitude generator 224 where the additive magnitude of the components are computed and presented to OR gate 225 and thence through memory gate 208, and buffer 209 to digital recorder 210. The results as recorded as a function of time represent the earth's magnetic field in the S direction corrected for micropulsation effects.

Figure 10A:
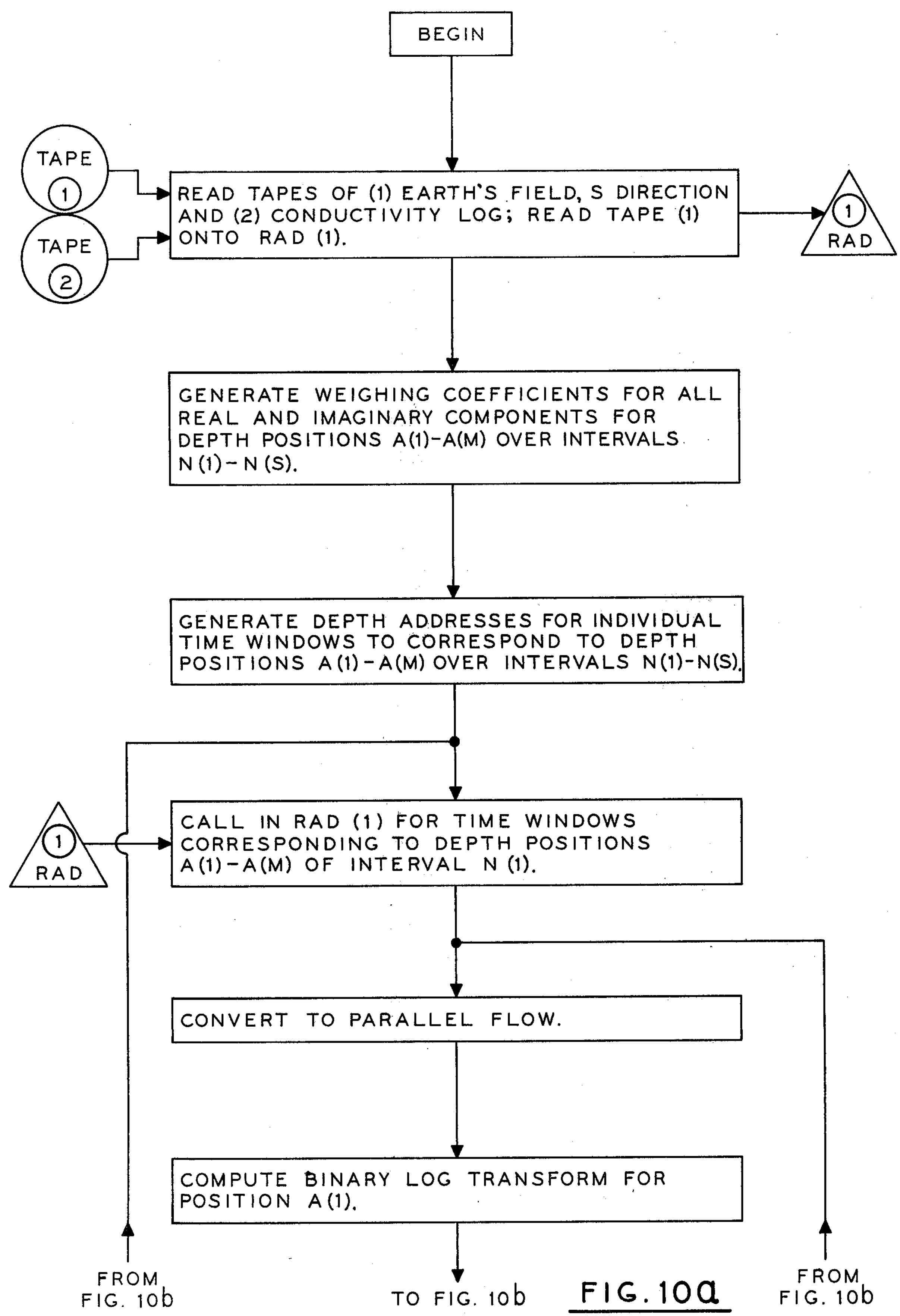
FIGS. 10*a* and 10*b* relate to a flow chart of a general-purpose computer program for performing filtering and migration operations in accordance with the micropulsation compensating circuit of FIGS. 8 and 9.
Figure 10B:
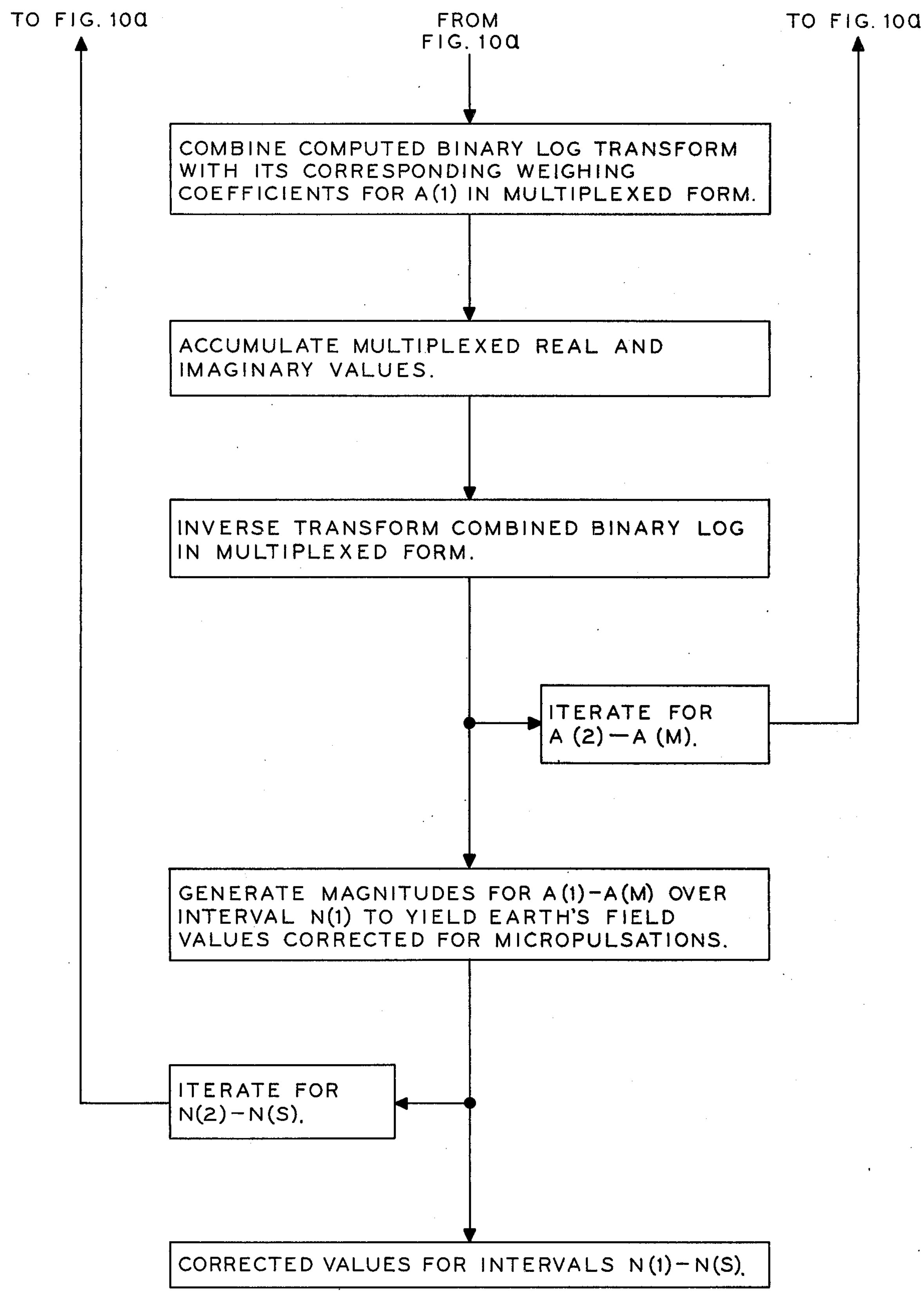

FIGS. 10*a* and 10*b* illustrate a flow chart of a general-purpose digital computer program which may be used to carry out one aspect of the method of the present invention.

As can be seen, the program is basically a logarithmic weighting scheme in accordance with the principles discussed above. As shown, the input tapes (1) and (2) are read. Tape (1) related the magnetic waveform is read into a large random access memory device, i.e., RAD (1). The program generates (1) weighting coefficients for all real and imaginary components of RAD (1) for all depth positions A(1)-A(M) over intervals N(1)-N(S) and for selected filtering operations; and (2) addresses for individual time windows of RAD (1) to correspond to same depth positions mentioned above. Then the program calls in RAD (1) for depth positions A(1)-A(M) over interval N(1) and computes the binary to log transform, filters and migrates same to the depth points of interest. The process then iterates for the remaining intervals N(2)-N(S).

While the specific steps for performing the method have been illustrated with reference to properly programmed digital computer, it is apparent that analog circuitry is available to those skilled in the art to duplicate those steps. Accordingly, it is to be solely defined by the following claims.

What is claimed is:

1. Apparatus for migrating time variations (micropulsations) of an earth's magnetic field waveform collected at a datum line to become associated with a series of depth locations in a well bore penetrating an earth formation comprising:

(a) memory means for storing said waveform as binary data, (b) means for digital filtering said binary data according to frequency characteristics of said data and including associated means for migrating said filtered data to said series of depth points as a function of conductivity of the intervening earth formation, and (c) means for storing said filtered and migrated data as a function of depth within said earth formation.

2. The apparatus of claim 1 in which (b) includes a series of parallel acting filtering means which filters in sequence accordance to a selected frequency band while rejecting components of said binary data outside said selected band.

3. The apparatus of claim 1 in which (b) includes (i) means for accepting said binary data and then converting said data to binary logarithmic form;

(ii) means for generating a weighting coefficient operator;

(iii) means for adding said operator and said binary logarithmic data to form summed data; and (iv) means for converting said summed data to binary data.

4. Method of migrating time variations (micropulsations) of an earth's magnetic field waveform collected at a datum line such as the earth's surface, to become associated with a series of depth locations in a well bore pentrating an earth formation, which comprises:

(a) digitally filtering said waveform according to its frequency characteristics, (b) migrating said filtered data to said series of depth locations in said well bore as a function of conductivity of the intervening earth formation, (c) storing said filtered and migrated data as a function of said depth locations in said well bore.

5. The method of claim 4 with the additional steps for using the results thereof to provide an indication of values of induced magnetization at said depth locations, comprising: computing said values of induced magnetization at said depth locations in accordance with the equation HOS(K) where HOS is stored and filtered data of step (c) and k is the magnetic susceptibility of the adjacent earth formation.

* * * * *